(No Model.)
C. RICHARDSON.
TROWEL HANDLE.
No. 314,479. Patented Mar. 24, 1885.
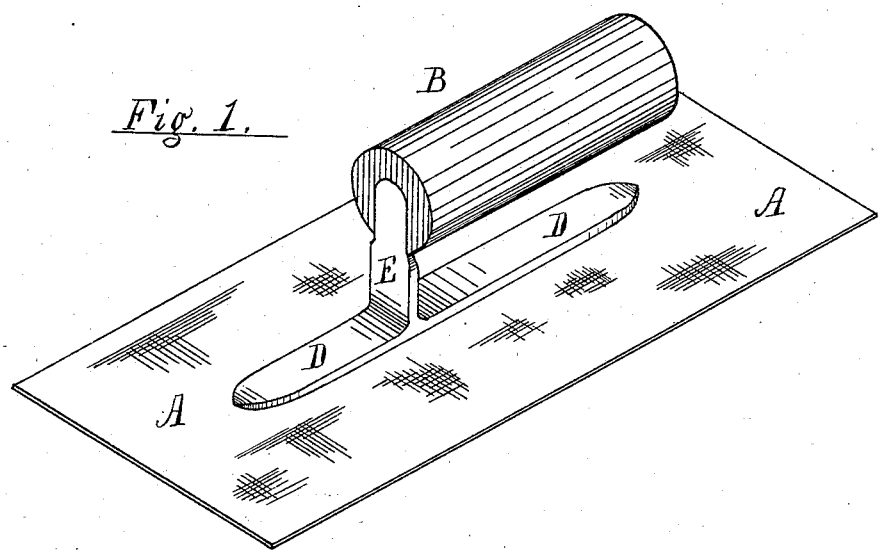
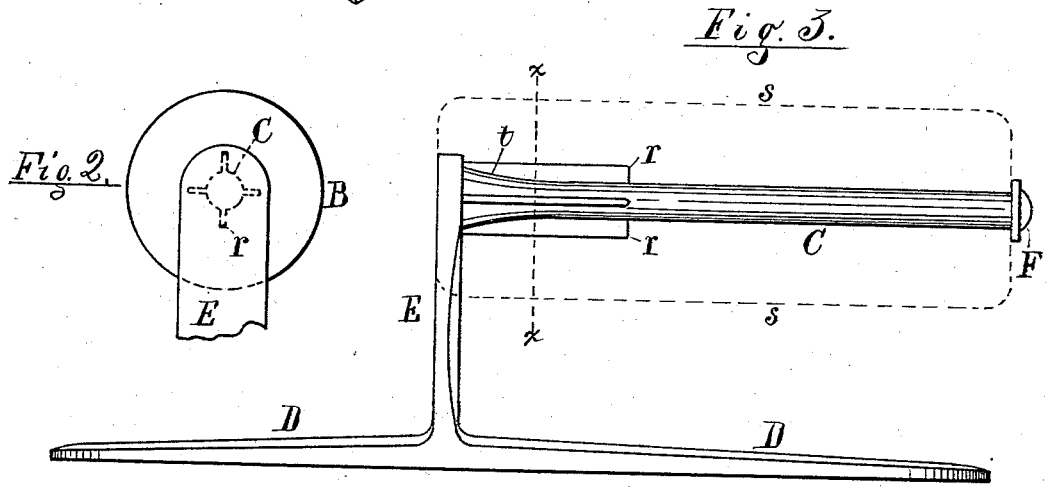
Attest.
Wam G. Crane
H. Theberath
Inventor.
C. Richardson, per
Thos. S. Crane, Atty though of a size to receive the shank closely, yet not of such a size as to admit the ribs without forcing them into the wood.

UNITED STATES PATENT OFFICE.

CHRISTOPHER RICHARDSON, OF NEWARK, NEW JERSEY.

TROWEL-HANDLE.

SPECIFICATION forming part of Letters Patent No. 314,479, dated March 24, 1885.

Application filed March 8, 1884. Renewed February 11, 1885. (No model.)

*To all whom it may concern:*

Be it known that I, CHRISTOPHER RICHARDSON, a citizen of the United States, residing in Newark, in Essex county, in the State of New Jersey, have invented certain new and useful Improvements in Trowel-Handles, fully described and represented in the following specification and the accompanying drawings, forming a part of the same.

This invention is intended to provide a better construction for the shank of the trowel when it is fitted into the wooden handle, so that the same may be readily inserted into a round hole and yet be prevented from turning or working loose therein; and it consists in forming the shank with projecting ribs upon a part or all of its length, and driving such ribs into the wood of the handle when the shank is inserted through a hole provided in the handle longitudinally.

The invention will be understood by reference to the drawings, in which Figure 1 is a perspective view of a trowel with the handle attached. Fig. 2 is an end elevation of the full size of the butt of the shank and the handle affixed. Fig. 3 is a side view of the shank, the stem attaching it to the foot, and the foot which is riveted to the blade A, the shank being provided at its butt with four longitudinal projecting ribs. Figs. 4, 5, and 6 are sections on line $x$ $x$ in Fig. 3 of shanks of different sectional form.

A is the blade of the trowel; B, the handle; C, the shank; D, the foot by which it is attached to the blade, and E the stem connecting the shank and the foot.

Heretofore the shank has been made of tapering form, and has commonly required to have the hole in the handle burned out by a tool of similar shape, so that the shank could be forced into the same and riveted fast, as at F in Fig. 3, without causing the handle to split.

In my invention a tight fit between the handle and shank is not secured by a tapering fit, but the shank is made substantially parallel at different parts, and ribs $r$ are formed upon the sides of the shank and are forced into the solid wood around the central shank when the latter is inserted into a hole of suitable size in the handle. The stem is generally notched into the end of the handle flush, as is shown at Fig. 1, and by dotted lines $s$ $s$ around the shank in Fig. 3; and as the handle must be driven upon the shank in a certain position to make the stem enter the notch formed at one side of the hole in the handle on the end, the ribs $r$ are preferably made shorter than the shanks C, and restricted to the part adjacent to the stem E, as shown in Fig. 3. The operator is thus enabled to push the handle upon the shank close enough to secure a coincidence of the stem E with the notch in the end of the handle before driving the handle upon the ribs $r$, which effectually prevent it from turning thereafter. The ribs may be formed as distinct flat projections upon two, three, or four sides of the shank, as indicated in Figs. 2, 3, 4, and 5, or as corrugations having sharp corners, as shown in Fig. 6. In using such construction the hole in the handle is bored to admit the shank freely or tightly, as may be preferred, and the ribs forced into the solid wood around the hole by driving the shank forcibly upon the handle. As the handle is constantly twisted upon its shank by the pressure applied to the edges of the blade A when in use, it is exceeding liable to work loose and to hold the tool insecurely; and the object of my invention is to secure a permanent tight hold of the handle upon the shank without the use of a taper fit, which may require a taper hole to be first formed in the handle.

By the substantially parallel form given to my shank and its attached ribs I am enabled to force it into a straight hole in the handle without splitting the latter, and thus save the cost of preparing a conical or burned hole of other shape.

The shank C and outer lines of the ribs $r$ may be made taper to any extent to facilitate the process of molding and casting the same of malleable iron, provided the shape thus obtained does not interfere with the driving of the shank into a parallel hole, and the shank may be especially tapered to strengthen its union with the stem at a point close to the latter, as shown in Fig. 3 at $t$, without interfering with the use of a straight hole in the handle, as the hole in the latter is preferably made a little larger than the shank if four ribs be used, to make the latter penetrate the wood more easily, and the taper at $t$ thus fits into such enlarged hole without any tendency to split the end of the handle.

Having thus explained the nature and objects of my invention, I claim the same as follows:

1. The combination, with the handle of a trowel, of the shank C, provided with ribs $r$, the shank being inserted in a hole bored in the handle, and the ribs being driven into the wood about the hole, all substantially as herein shown and described.

2. The combination, with the handle B, having central bored hole and notch cut in the end at one side of the hole, as described, of the stem E, fitted to said notch, and the shank C, provided with the ribs $r$, driven into the wood, and having its end secured in the handle by rivet F, all as shown and described.

In testimony whereof I have hereunto set my hand in the presence of two subscribing witnesses.

CHRISTOPHER RICHARDSON.

Witnesses:
 THOS. S. CRANE,
 A. VAN ARSDALE.